(12) United States Patent
Matthews et al.

(10) Patent No.: US 10,337,667 B2
(45) Date of Patent: Jul. 2, 2019

(54) MODULAR MOTORIZED SLIDER SYSTEM

(71) Applicant: Dyno Equipment, Inc., Newport Beach, CA (US)

(72) Inventors: Scott Matthews, Newport Beach, CA (US); Christopher M. Szczur, Rockville, MD (US)

(73) Assignee: DYNO EQUIPMENT, INC., Newport Beach, CA (US)

( * ) Notice: Subject to any disclaimer, the term of this patent is extended or adjusted under 35 U.S.C. 154(b) by 1 day.

(21) Appl. No.: 15/646,298

(22) Filed: Jul. 11, 2017

(65) Prior Publication Data

US 2018/0023755 A1 Jan. 25, 2018

Related U.S. Application Data

(60) Provisional application No. 62/360,698, filed on Jul. 11, 2016.

(51) Int. Cl.
| | | |
|---|---|---|
| *F16M 11/42* | (2006.01) | |
| *F16M 11/04* | (2006.01) | |
| *F16M 11/24* | (2006.01) | |

(52) U.S. Cl.
CPC ......... *F16M 11/425* (2013.01); *F16M 11/041* (2013.01); *F16M 11/045* (2013.01); *F16M 11/24* (2013.01)

(58) Field of Classification Search
CPC .. F16M 11/425; F16M 11/041; F16M 11/045; F16M 11/24; F16M 13/022; F16M 11/2085; F16M 11/42; F16M 11/242; G03B 17/561; G03B 17/56

USPC .... 248/128, 168, 439, 170, 163.1, 525, 647, 248/72, 228.1, 228.3, 228.5, 228.7; 403/292–313

See application file for complete search history.

(56) References Cited

U.S. PATENT DOCUMENTS

| | | | | |
|---|---|---|---|---|
| 3,396,851 | A * | 8/1968 | Collins | ................ B65D 85/68 211/49.1 |
| 2008/0257199 | A1 * | 10/2008 | Jackson | ................ B61B 13/04 105/144 |
| 2009/0315288 | A1 | 12/2009 | Hernandez | |
| 2010/0008661 | A1 | 1/2010 | Wood | |
| 2014/0076192 | A1 * | 3/2014 | Hurd | .................... F16M 11/18 104/165 |
| 2014/0299013 | A1 | 10/2014 | Hall | |
| 2015/0012168 | A1 * | 1/2015 | Kuklish | ................... G05D 1/02 701/23 |

(Continued)

OTHER PUBLICATIONS

International Searching Authority, International Search Report for PCT/US17/41446, dated Oct. 30, 2017, ISA/US, United States.

(Continued)

*Primary Examiner* — Christopher Garft
(74) *Attorney, Agent, or Firm* — Greenspoon Marder LLP; Todd Langford

(57) ABSTRACT

A modular, motorized camera slider system for use with various camera devices, including mobile phones and small, lightweight portable video cameras. A motorized shuttle, straight and curved connectable track pieces, and removable bipod legs enables users to add controlled linear movements to video and time lapse photography. The motorized shuttle supports a camera and moves along the connected tracks, which in turn are supported by the bipod legs or other support system.

18 Claims, 10 Drawing Sheets

(56) References Cited

U.S. PATENT DOCUMENTS

2015/0234258 A1\* 8/2015 Hida .................... G03B 17/561
                                                                                           396/428

OTHER PUBLICATIONS

International Searching Authority, Written Opinion of the International Searching Authority for PCT/US17/41446, dated Oct. 30, 2017, ISA/US, United States.

\* cited by examiner

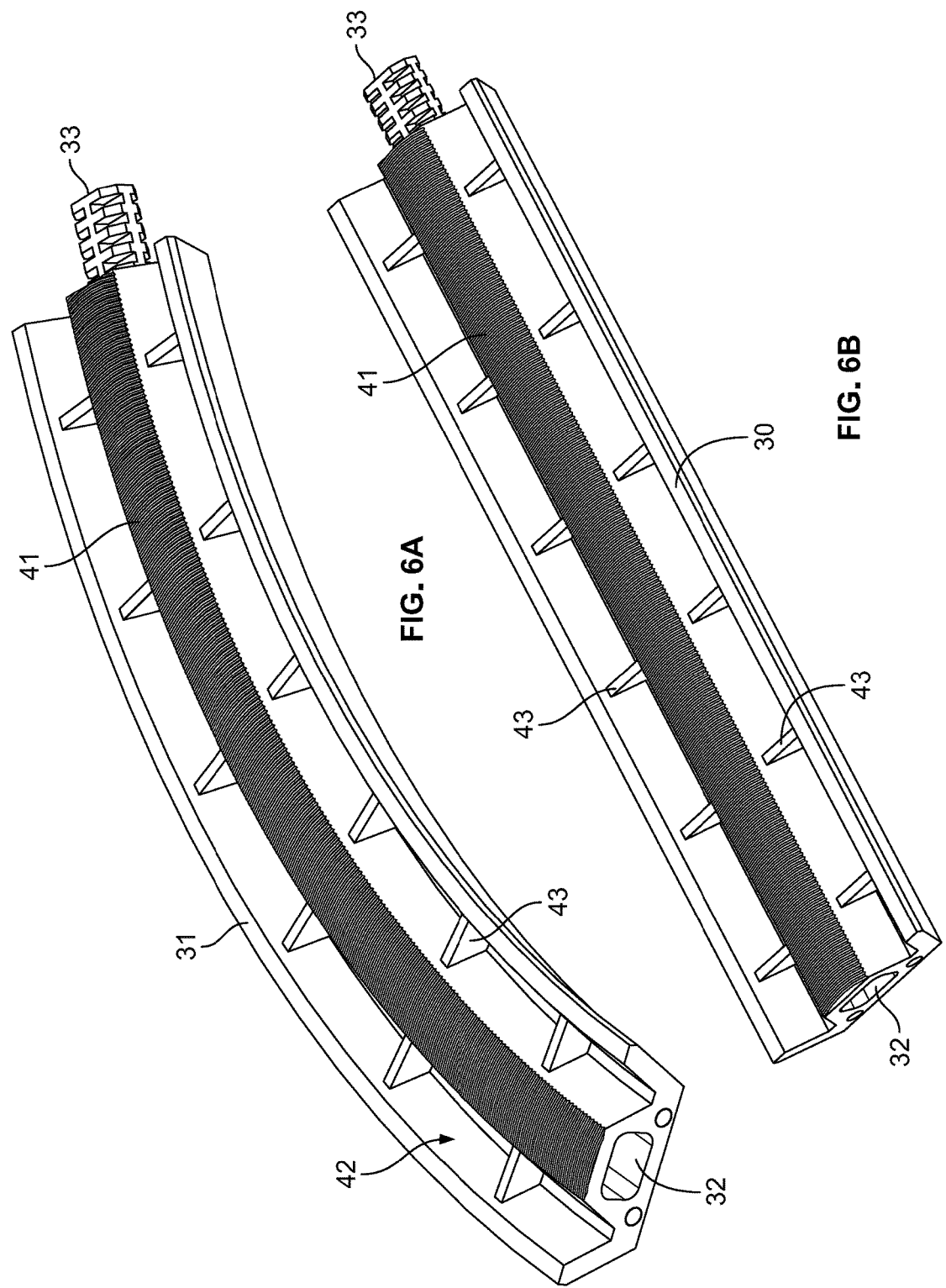

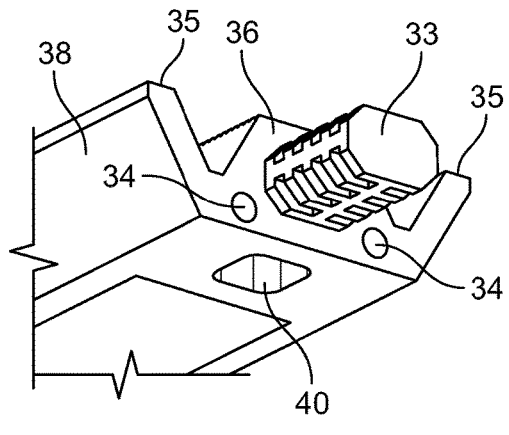 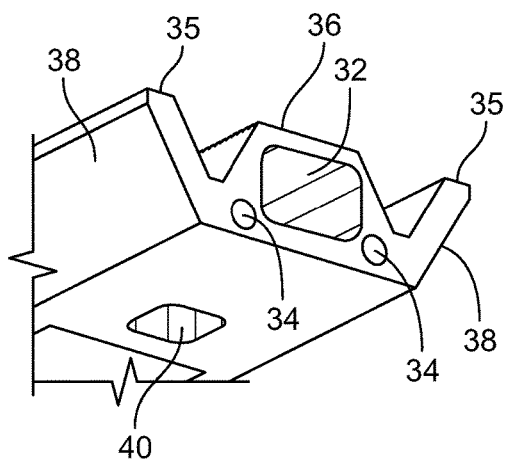
FIG. 7A  FIG. 7B
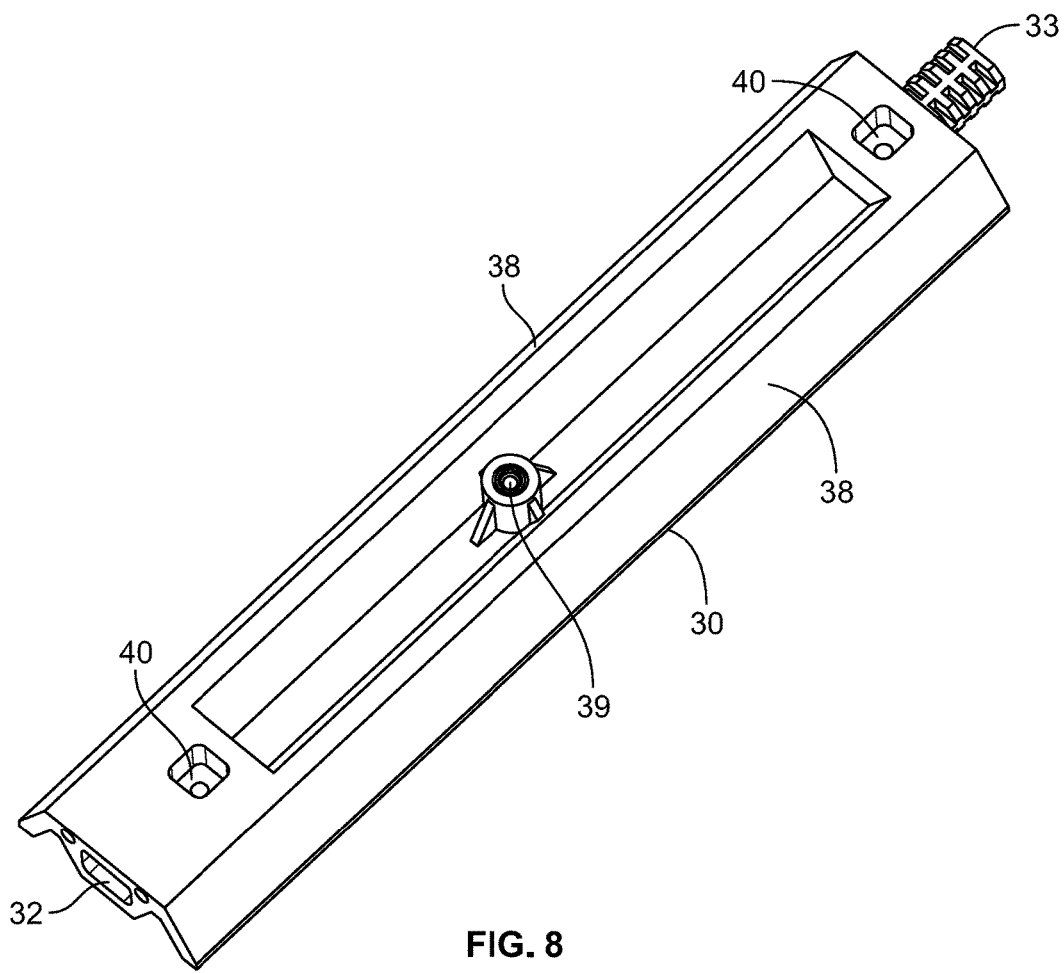
FIG. 8

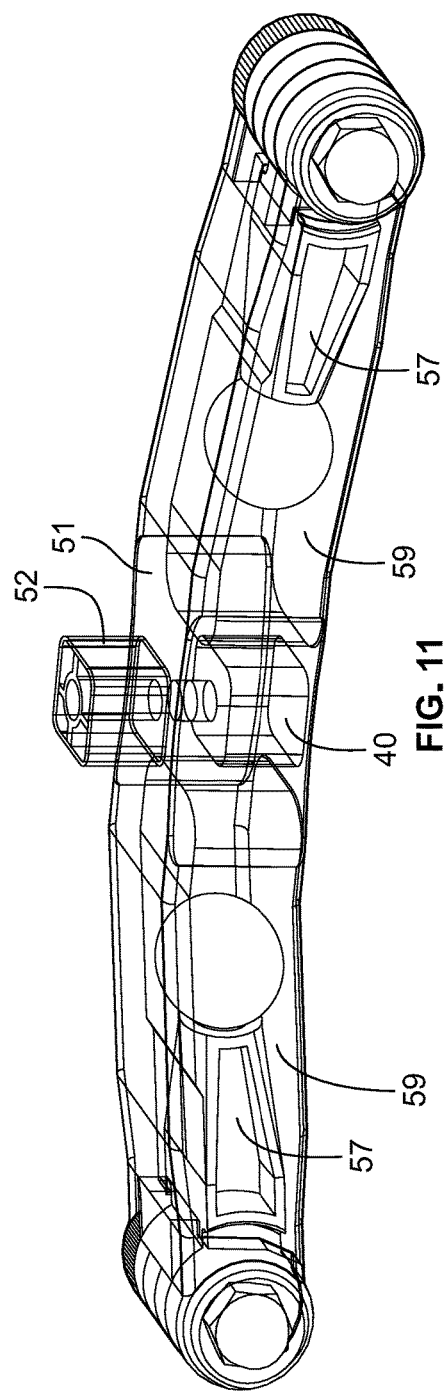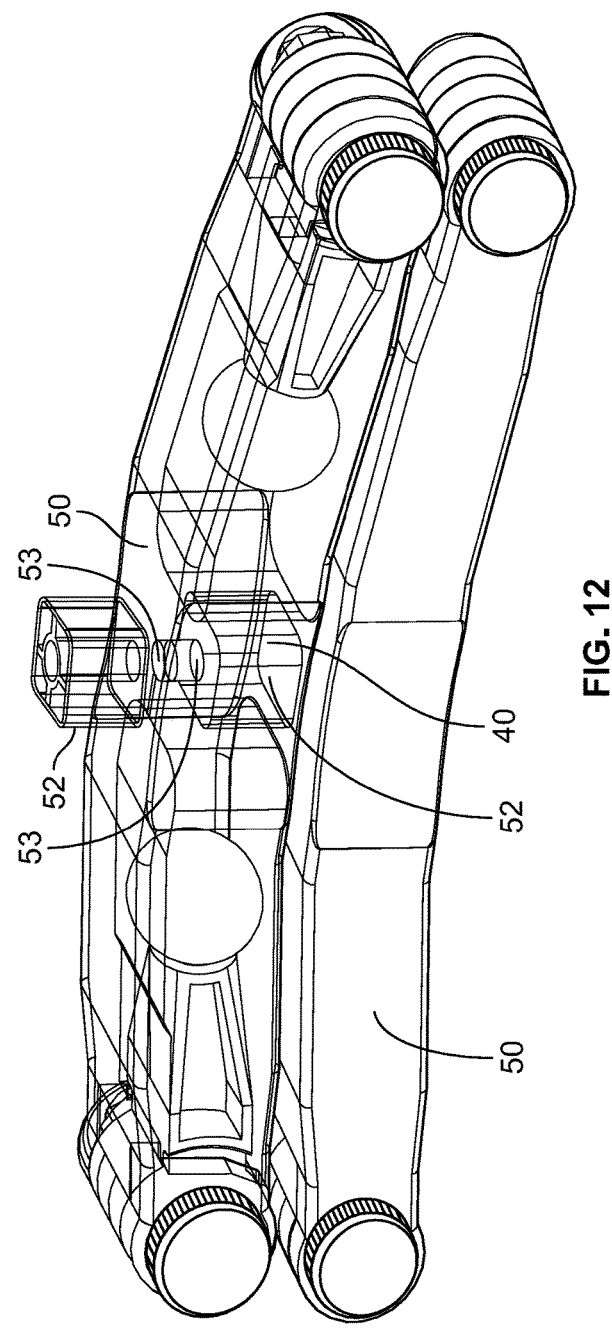

MODULAR MOTORIZED SLIDER SYSTEM

CROSS REFERENCE TO RELATED APPLICATIONS

This document claims the benefit of U.S. Prov. Pat. App. No. 62/360,698 entitled MODULAR, MOTORIZED CAMERA SLIDER SYSTEM filed on Jul. 11, 2016, the entirety of which is hereby incorporated by reference.

BACKGROUND

This disclosure relates to the general field of slider systems, and more specifically toward a modular, motorized camera slider system for use with various camera devices, including mobile phones and small, lightweight portable video cameras. A motorized shuttle, straight and curved connectable track pieces, and removable bipod legs enables users to add controlled linear movements to video and time lapse photography. The motorized shuttle supports a camera and moves along the connected tracks, which in turn are supported by the bipod legs or other support system.

Advanced camera technology such as high-quality video and time-lapse photography, once extremely expensive and the domain of professionals, is now in common use by consumers via their mobile phones, portable video cameras, and other portable electronic devices. Adventurers rafting down a river record high-definition video using their GoPro® cameras. Mountain climbers dangling off the side of a cliff take high-resolution selfies with their mobile phones. Hikers capture time-lapse video of the morning sunrise with their tablet computer. The use of small, portable cameras continues to increase. Likewise, there is demand for cost-effective systems that utilize these powerful mobile cameras to create unique visual effects.

Thus, there has existed a long-felt need for an inexpensive modular motorized slider system that supports various small portable camera systems for creating customizable, smooth, controlled linear movements.

SUMMARY

The current disclosure provides just such a solution by having a modular, motorized camera slider system for use with various camera devices, including mobile phones and small, lightweight portable video cameras. A motorized shuttle, straight and curved connectable track pieces, and removable bipod legs enables users to add controlled linear movements to video and time lapse photography. The motorized shuttle supports a camera and moves along the connected tracks, which in turn are supported by the bipod legs or other support system.

According to particular embodiments of the current disclosure, the slider systems includes a plurality of connectable curved and straight track pieces. The tracks connect to one another via magnetic connections along with mating male and female connections. Almost any distance or configuration is possible utilizing multiple curved tracks, straight tracks, or a combination thereof while at the same time allowing for easy disassembly and transport. The bottom of each track piece includes female connection ports for bipod legs, discussed in more detail below, as well as standard ¼-20 inserts used to mount to third party camera accessories, for example, tripods. Alternative embodiments provide for latching tracks together using latching mechanisms.

The track sections or pieces include a central rail that runs down a middle longitudinal portion or axis of the track piece. The central rail is disposed between right and left outer angled rails. The outer angled rails may be each separated from the central rail by a spacing or valley, or alternatively, may be continuous and form one solid upper surface from an outer rail to the center rail to the opposite outer rail. In any configuration, the track body itself may be solid or hollow. The outer angled rails may be distanced equally from the center rail to complement the symmetrically geometry, however, alternative embodiments provide for a distance between the central rail and the left outer angled rail that may be greater or less than the distance between the central rail and the right outer angled rail. Moreover, track pieces with various radiuses of curvature may be provided to facilitate highly customized shuttle paths.

To support the tracks, connectable, nesting, and adjustable bipod legs are provided. Each leg is connected to the track via mating male protrusions and female ports or depressions coupled with magnets to assist in securing the connection. Nonetheless, alternative embodiments utilizing mating connections without magnets, but rather relay upon sliding, latching, friction, or other mechanisms of attachment. The male protrusion of a bipod leg is inserted into and mates with a female port in the bottom of a curved or straight track piece. A bipod leg includes two arms that are connected to the main body of the leg via a hinge. Friction thumb screws enable users to quickly loosen and tighten the hinged connection between the leg body and the arm to provide a wide range of heights and positions of the leg, and thus the track it supports. Alternatively, a threaded screw and insert may be provided to adjust the axial height as one tunes the threaded feature. A rubber ball is affixed to the end of each arm to provide a stable, adaptable, high friction surface to reduce if not eliminate movement relative to the surface that it resides upon.

The bipod legs may also be stacked or nested to provide additional configurations. A female port or depression is located below the male protrusion in the leg, wherein the male protrusion of one leg may mate with the female port of another leg. Cavities within the main body of the leg also provide for the arms to fold within the main body of the leg, further assisting the stacking of legs on top of each other. Thus, the height of the track may be adjusted by stacking multiple bipod legs on top of each other.

A motorized shuttle supports a camera and travels along the tracks. The electrical, driving, and suspension components are located and assembled inside the shuttle that moves along the track, allowing for unrestricted motion along any variation of track length and pieces in both forward and reverse directions.

The shuttle includes a main body, a suspension arm and a housing. The main body supports the electronics, drive wheel, and motor as well as the springs that serve as the main power transmission in the suspension system. The suspension system enables the shuttle to travel along the tracks under a wide range of configurations, from a flat horizontal surface to a vertical incline, without falling off. At the same time, the user may easily attach and detach the shuttle to and from the track at any position. Linear springs along extruded shafts of the suspension arm contact the inside of the main body of the shuttle to create an inward or pulling force when the suspension arm is withdrawn away from the main body. Alternative embodiments provide for torsion springs, hinges, and mechanical latching mechanisms to connect and secure the shuttle to the track. A drive wheel mounted directly to an electric DC gear motor drives the shuttle along the tracks. The suspension arm pulls the wheel onto the track creating sufficient friction for the shuttle to move along the track when the motor is engaged. Particular embodiments provide for a geared drive wheel, or a drive gear, that mates with a grooved face on the track allowing for a more solid connection and a lower chance of slippage. The shuttle is stabilized on the track by free spinning rubber wheels located on the sides of the suspension arm and the side roller of the main shuttle body, as well as plastic nubs located on the underside of the main body that contact the upper surface of the tracks.

The outer angled rails have a tapered, inward angle from the vertical that complement the inward, tapered angles of the inner surface of the shuttle's side rollers and suspension arm. The geometric relationship between the shuttle side rollers and the angled rails of the track pieces enables the shuttle to move along the assembled track pieces in almost any attitude including a vertical, angled horizontal, rotating and even inverted movement path. The drive wheel of the shuttle is in contact with the upper surface of the central rail of the track, while the right and left side roller and suspension arm wheels are in contact with the outer surface of the outer rails, that is, the right and left outer rails. When present, the plastic stabilizing nubs attached to the bottom surface of the shuttle slide against the upper surface of the outer rails to facilitate a close fit against the track pieces and assisting in providing smooth travel along the track pieces.

It is an object of the current disclosure to provide a system for moving a camera along a straight and curved path.

It is another object of the current disclosure to provide a slider system for supporting a camera along a horizontal, vertical, or inclined path.

It is a further object of this disclosure to provide a highly configurable camera slider system that creates smooth movements along a wide variety of paths.

An embodiment of the current disclosure is a camera slider system comprising a track having an upper surface, a first outer rail, a second outer rail, a first track connecter, a second track connecter, and a leg connecter, where the first track connecter includes a protrusion, where the second connecter includes a depression, where an outer surface of the first rail has an inward slope, and where an outer surface of the second rail has an inward slope; a leg having a leg connecter, where the leg connector of the leg mates with the leg connector of the track; a shuttle having a main body and a suspension arm, where the main body includes a drive wheel, and a side roller, where the drive wheel engages the upper surface of the track, where the suspension arm provides a force pulling the main body towards the suspension arm, where the suspension arm engages the outer surface of the first rail, and where the side roller engages the outer surface of the second rail. The first track connecter further includes a first fastener, wherein the second track connecter further includes a second faster. The suspension arm has an inward slope that matches the inward slope of the outer surface of the first rail, and where an inner surface of the side roller has an inward slope that matches the inward slope of the outer surface of the second rail. The shuttle also has a motor, where the motor drives the drive wheel. The inward slope of the outer surface of the second rail matches the inward slope of the outer surface of the first rail such that both the inward slope of the inner surface of the suspension arm and the inward slope of the inner surface of the side roller match the inward slope of the outer surface of the first rail and the inward slope of the outer surface of the second rail. The suspension arm further includes a spring, where the spring provides the force pulling the main body towards the suspension arm. The suspension arm includes a wheel, where the wheel of the suspension arm engages the outer surface of the first rail. The side roller includes a wheel, where the wheel of the side roller engages the outer surface of the second rail. The main body further includes a plurality of stabilizing nubs, where the stabilizing nubs engage the upper surface of the track. The wheel is a drive gear, and where the upper surface of the track has a grooved face, where the drive gear engages the grooved face of the upper surface of the track. The main body of the shuttle further includes a mounting screw for securing a camera body thereto. The leg has a leg body and two arms, where each arm is rotatably secured to the leg body by a hinge, where the leg body has two swing arm cavities into which the swing arms may rotate. The leg body of the leg further comprises a nested leg connecter, where the leg connector of the leg has a protrusion, and where the nested leg connector of the leg body has a depression. The track has a central rail, where there is a first space between the first rail and the central rail, and where there is a second space between the second rail and the central rail.

Another embodiment of the current disclosure is a slider system comprising a plurality of tracks, where each track has an upper surface, a first outer rail, a second outer rail, a first track connecter, a second track connecter, where the first track connecter includes a protrusion, where the second connecter includes a depression, where an outer surface of the first rail has an inward slope, and where an outer surface of the second rail has an inward slope, where the first track connector of one of the plurality of tracks mates with the second track connector of another of the plurality of tracks; a shuttle having a main body and a suspension arm, where the main body includes a drive wheel and a side roller, where the drive wheel engages the upper surface of the track, where the suspension arm provides a force pulling the main body towards the suspension arm, where the suspension arm engages the outer surface of the first rail, and where the side roller engages the outer surface of the second rail. The first track connecter of each track has a magnet, wherein the second track connecter of each track has a magnet, where the magnet of the first track connecter of one of the tracks mates with the magnet of the second track connecter of another of the tracks. The suspension arm has an inner surface with an inward slope, where the inward slope of the outer surface of the first rail complements the inward slope of the inner surface of the suspension arm. The side roller has an inner surface with an inward slope, where the inward slope of the outer surface of the second rail complements the inward slope of the inner surface of the side roller.

An additional embodiment of the current disclosure is a slider track system comprising a plurality of tracks, where each track has an upper surface, a first outer rail, a second outer rail, a first track connecter, a second track connecter, and a first leg connection, where the first track connecter includes a protrusion, where the second connecter includes a depression, where an outer surface of the first rail has an inward slope, and where an outer surface of the second rail has an inward slope, where the first track connector of one of the plurality of tracks mates with the second track connector of another of the plurality of tracks; and a plurality of bipod legs, where each bipod leg has a main body and two arms, where each arm is secured to the main body by a hinge, where the main body has a first leg connection, a second leg connection, and two arm cavities, where the arms may rotate about the hinge and into the arm cavities; where the second leg connection of each bipod leg can mate with the first leg connection of each track. The first leg connection of each track is a female leg connection, and where the second leg connection of each bipod leg is a male leg connection.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features in order that the detailed description thereof may be better understood, and in order that the present contribution to the art may be better appreciated. There are additional features that will be described hereinafter and which will also form the subject matter of the claims appended hereto. The features listed herein and other features, aspects and advantages will become better understood with reference to the following description and appended claims.

BRIEF DESCRIPTION OF THE FIGURES

The accompanying drawings, which are incorporated in and form a part of this specification, illustrate embodiments of the current disclosure and together with the description, serve to explain the principles thereof.

FIG. 6A is a perspective view of a curved track piece according to selected embodiments of the current disclosure.

FIG. 6B is a perspective view of a straight track piece according to selected embodiments of the current disclosure.

FIG. 7A is a partial bottom perspective view of a straight track piece according to selected embodiments of the current disclosure.

FIG. 7B is a partial bottom perspective view of the opposite side of the straight track piece in FIG. 7A according to selected embodiments of the current disclosure.

FIG. 8 is a bottom perspective view of a straight track piece according to selected embodiments of the current disclosure.

FIG. 11 is a perspective view of a bipod leg with the arms rotated within the main body of the leg according to selected embodiments of the current disclosure.

FIG. 12 is a perspective view of stacked bipod legs according to selected embodiments of the current disclosure.

DETAILED DESCRIPTION

Figure 1:
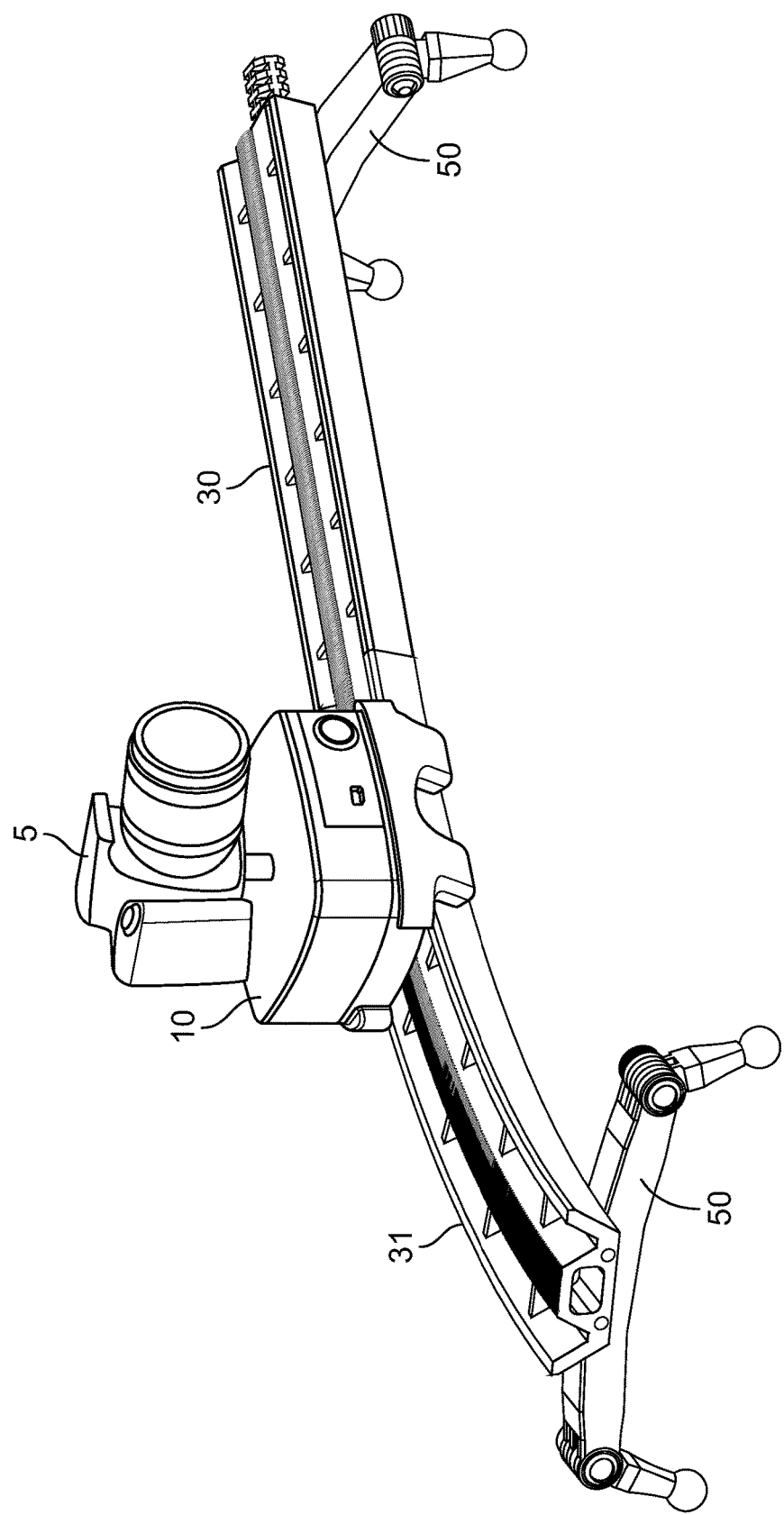
FIG. 1 is a perspective view of a modular motorized slider system with a camera according to selected embodiments of the current disclosure.

Many aspects of the current disclosure can be better understood with the references made to the drawings below. The components in the drawings are not necessarily drawn to scale. Instead, emphasis is placed upon clearly illustrating the components of the present disclsoure. Moreover, like reference numerals designate corresponding parts through the several views in the drawings.

FIG. 1 is a perspective view of a modular motorized slider system with a camera according to selected embodiments of the current disclosure. A camera 5 is secured to a shuttle 10. The shuttle 10 is secured to and moves along tracks 30,31. Straight track 30 is connected to curved track 31 to form one continuous track. One leg 50 is mated and secured to curved track 31, and another leg 50 is mated and secured to straight track 30.

Figure 2:
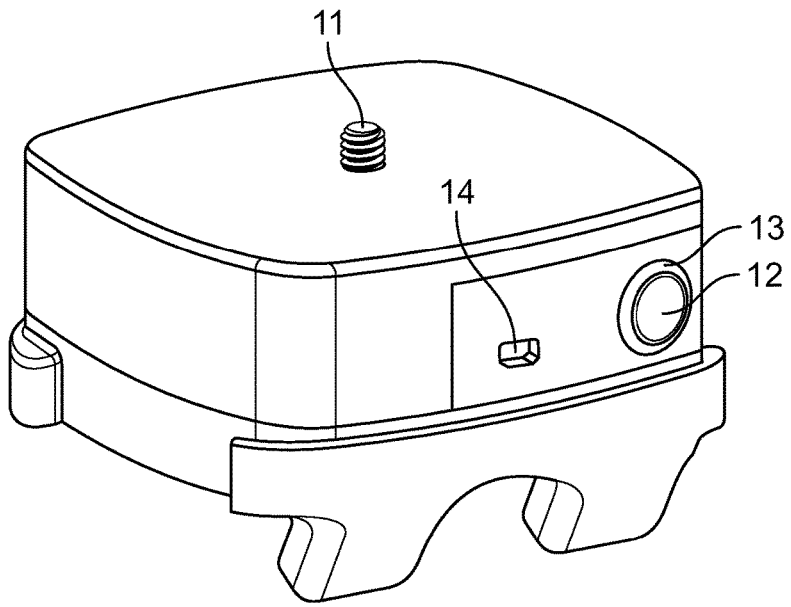
FIG. 2 is a perspective view of a shuttle according to selected embodiments of the current disclosure.

FIG. 2 is a perspective view of a shuttle according to selected embodiments of the current disclosure. The shuttle includes a mounting screw 11 to secure cameras or other mounting accessories thereto. For example, a mobile phone mount may be secured to the shuttle via the mounting screw 11 to secure a mobile phone to the shuttle. An electrical port 14 is utilized for providing electrical power to the shuttle. Some embodiments of the current disclosure are battery powered, wherein the electrical port 14 is used to charge the batteries of the shuttle. Alternatively, a power supply connected to the shuttle through electrical port 14 provides sufficient electrical power to the shuttle during use. For example, electrical port 14 may be a USB-C port. A button 12 may be used to interact with the shuttle, such as to turn the unit on and off as well as perform various functions. An indicator light 13, in this view, a ring light illuminated by light emitting diodes, provides visual feedback to a user.

The shuttle is controlled through a software application, also referred to as an app, such as a mobile app running on iOS® or Android® operating systems. The app running on a computing device, such as a mobile phone, tablet, laptop, or computer, communicates wirelessly with the shuttle, for example, by utilizing Bluetooth® wireless technology. Alternatively, the app may communicate with the shuttle through a wired electrical connection via the electrical port 14 or another interface. The button 12 on the shuttle serves as a multifunction button (for example, on, off, start, and stop functions). The indicator light 13, for example, LED ring light, around the button 12 servers as an indicator for the status of the shuttle. For example, when the shuttle is advertising a Bluetooth signal and ready to connect, the LED ring will pulse blue. Once connected it will turn solid green. For charging, orange blinks will depict charge level. Likewise, other colors and durations of illumination are used to indicate other statuses of the shuttle.

The app controls the shuttle in a variety of ways. For simple settings, users may select distance and time and the app or shuttle will calculate the necessary speed and cause the shuttle to move at that rate. For advanced settings and nightlapse settings, more finite controls are available to set the amount of steps the shuttle moves per inch as well as the interval between the steps, which determines the overall duration.

Figure 3:
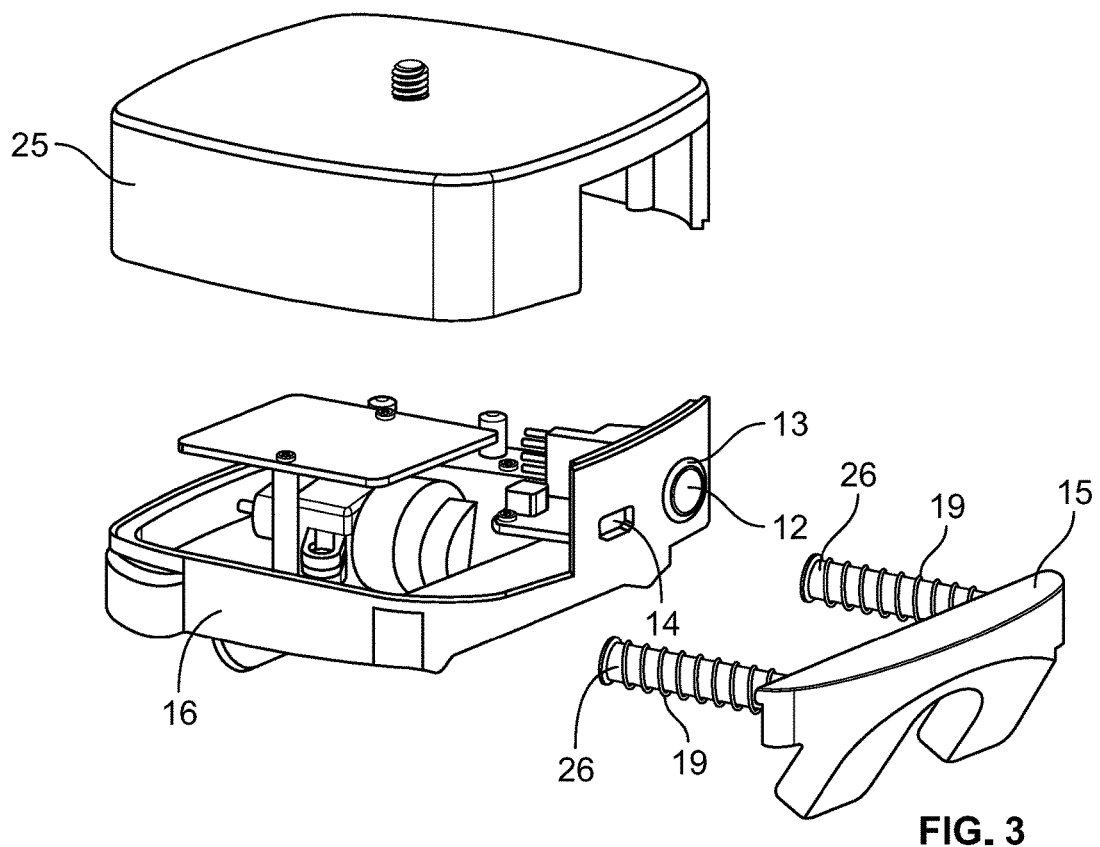
FIG. 3 is an exploded perspective view of a shuttle according to selected embodiments of the current disclosure.

FIG. 3 is an exploded perspective view of a shuttle according to selected embodiments of the current disclosure. The housing 25 covers the top of the main body 16 to protect the components therein, as well as provide a base for the camera or other attachments. A suspension arm 15 slides into and out of the main body 16 along shafts 26. Springs 19 around shaft 26 provide a restoring force that pulls the suspensions arm 15 towards the main body 16 of the shuttle. The electrical port 14 as well as the button 12 and indicator light 13 are mounted to the main body 16.

Figure 4:
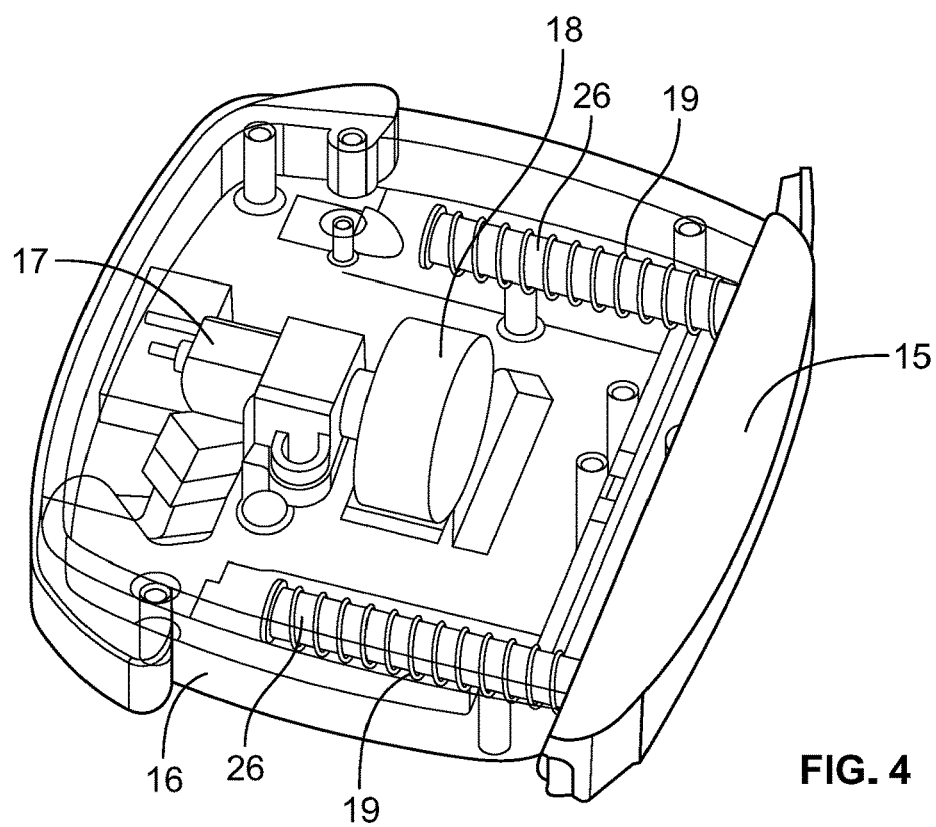
FIG. 4 is a perspective view of a shuttle with its housing removed according to selected embodiments of the current disclosure.

FIG. 4 is a perspective view of a shuttle with its housing removed according to selected embodiments of the current disclosure. The drive wheel 18, located in the middle of the shuttle in this view, is driven by an electric motor 17. The suspension arm 15 slides in and out of the main body 16 along shafts 26. Springs 19 around shafts 26 provide a force that pulls the suspension arm 15 towards the main body 16.

Figure 5:
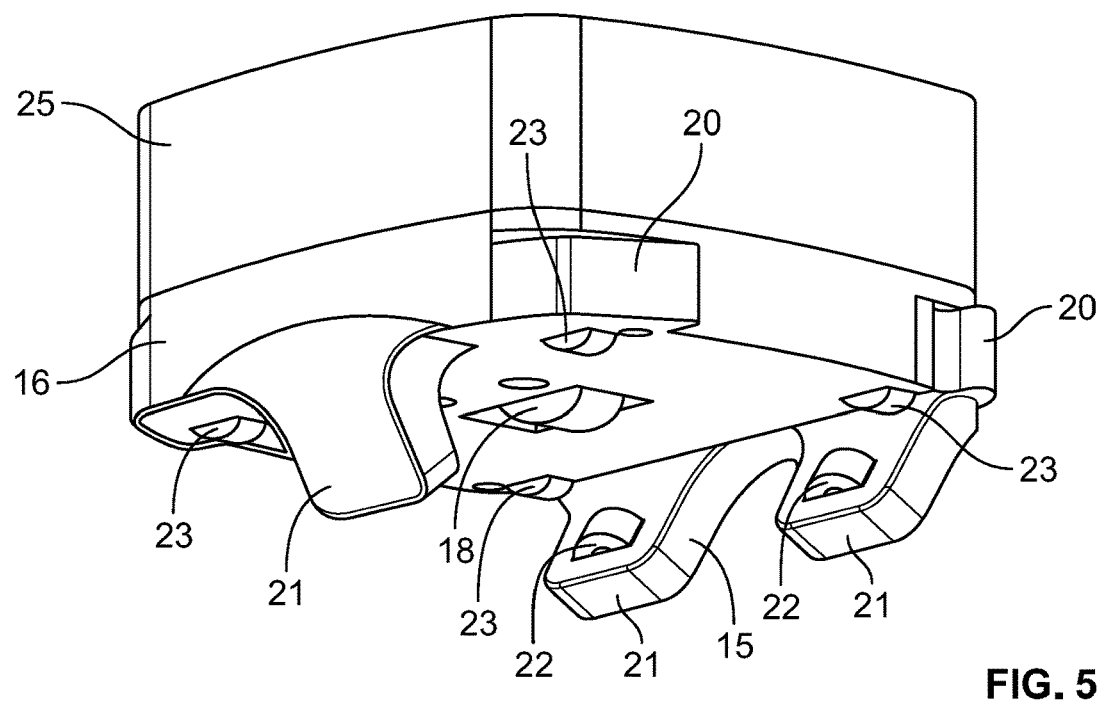
FIG. 5 is a bottom perspective view of a shuttle according to selected embodiments of the current disclosure.

FIG. 5 is a bottom perspective view of a shuttle according to selected embodiments of the current disclosure. The drive wheel 18 extends partially through the bottom of the main body 16. The main body 16 includes a side roller 21 that extends down and inward at an angle. Described in more detail below, the angle of the side roller complements the angle of the outer rail of the corresponding track. On the opposite side of the shuttle is the suspension arm 15, which itself has two side rollers 21. As will be appreciated by those skilled in the art, the main body 16 may include two side rollers while the suspension arm includes only one side roller, or each may include two side rollers or more. Each side roller 21 has a wheel 22 that engages the outer rail of the track (not shown in this figure). Alternatively, nubs or other low friction elements or surfaces of the side rollers 21 may be utilized instead of wheels 22. Nubs 23 on the bottom surface of the main body 16 engage the upper surface of the outer rails of the track (not shown in this figure). The nubs 23 are low friction surfaces that slide easily against the surface of the track while providing a more stable structure to support the camera as it moves along the track. Thumb grips 20 provide convenient surfaces with which to grab the shuttle and pull the suspension arm 15 away from the main body 16. For example, a user looking to place the shuttle onto a section of track may grasp the thumb grips 20 and pull, thereby causing the suspension arm 15 to move away from the main body 15 and the side rollers to separate. With sufficient space between the side rollers, the user places the shuttle onto the track, and releases the thumb grips. The springs (not shown in this figure) provide an inward or pulling force that causes the suspension arm 15 to move back towards the main body. The side rollers 21 with wheels 22 then engage the outer surface of the outer rails and secure the shuttle to the track.

FIG. 6A is a perspective view of a curved track piece according to selected embodiments of the current disclosure. FIG. 6B is a perspective view of a straight track piece according to selected embodiments of the current disclosure. The curved track 31 and straight track 30 each has a male track connection 33 on one end and a female track connection 32 on the opposite end. The upper surface 41 of the track may include ridges or grooves to provide a higher friction surface with which the drive wheel may engage. A valley 42 or space between the center rail and outer rails is shown, with rails supports 43 spanning there between to provide sufficient support.

FIG. 7A is a partial bottom perspective view of a straight track piece according to selected embodiments of the current disclosure. This end of the straight track includes a protruding male track connection 33 extending from the center rail 36. Towards the bottom and on either side of the male track connection 33 are fasteners such as magnets 34. On either side of the center rail 36 are the outer rails 35, each with inwardly sloping outer surfaces 38. At the bottom of the track is a female leg connection port 40 which mates with a male leg connection, such as that shown in FIG. 9.

FIG. 7B is a partial bottom perspective view of the opposite side of the straight track piece in FIG. 7A according to selected embodiments of the current disclosure. This end of the track includes a depressed female track connection 32 extending into the center rail 36. The male track connection 33 engages the female connection 32, though obviously from different track pieces. Towards the bottom and on either side of the female track connection 32 are fasteners such as magnets 34. These magnets 34 mate with other magnets adjacent to the male track connection of other tracks to help secure two track pieces together. On either side of the center rail 36 are the outer rails 35, each with inwardly sloping outer surfaces 38. As with the opposite end, at the bottom of the track is a female leg connection port 40 which mates with a male leg connection, such as that shown in FIG. 9.

FIG. 8 is a bottom perspective view of a straight track piece according to selected embodiments of the current disclosure. A female leg connection 40 port or depression is located at each end of the track. An insert 39 for connecting the track to another leg support, such as a standard tripod, is provided in the center of the track. It should be appreciated that the insert 39 may be located at other positions along the track, or multiple inserts 39 may be included. Likewise, a single female leg connection 40 may be employed, or multiple female leg connections at positions throughout the length of the track.

Figure 9:
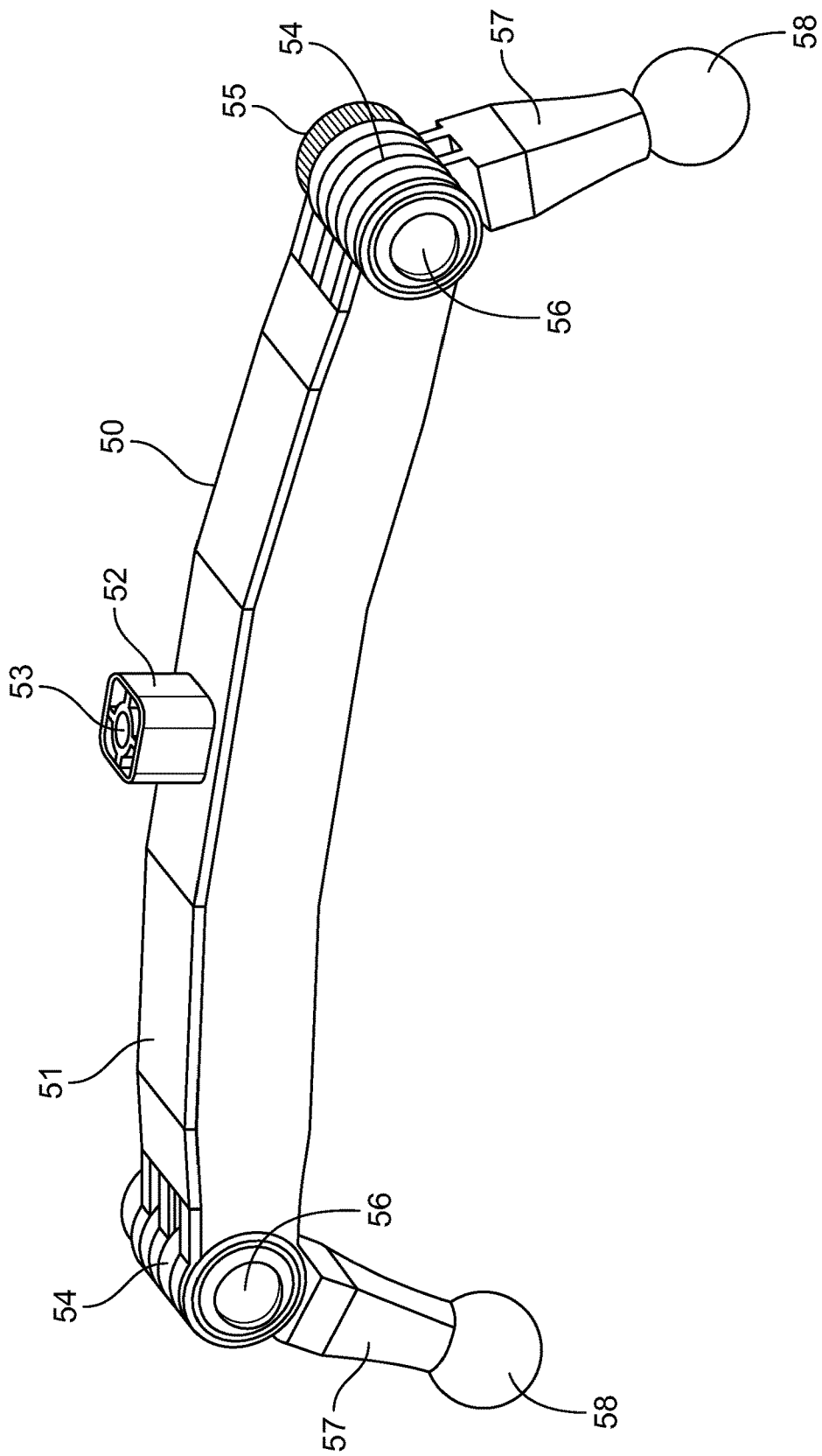
FIG. 9 is a perspective view of a bipod leg according to selected embodiments of the current disclosure.

FIG. 9 is a perspective view of a bipod leg according to selected embodiments of the current disclosure. The leg 50 includes a main body 51. The middle of the main body 51 includes a male leg connection 52 with an optional magnet 53 at the top. Each end of the main body 51 includes swing arms 57 that rotate about hinges 54 secured by thumb screws 55 and cap nuts 56. The end of each swing arm 57 may have a rubber ball 58 which provides a high friction and stable surface for supporting the bipod leg 50 and thus the track as a whole.

Figure 10B:
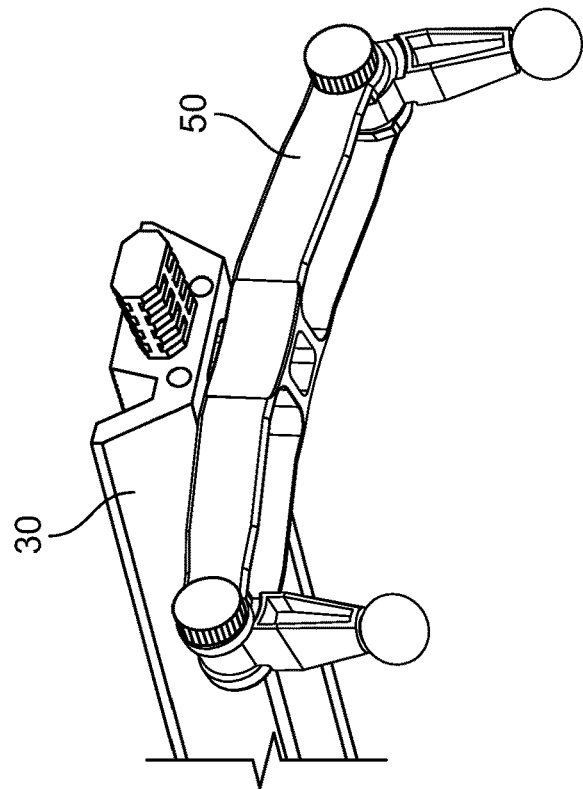
FIG. 10B is a bottom perspective view of a bipod leg mated to a straight track piece according to selected embodiments of the current disclosure.
Figure 10A:
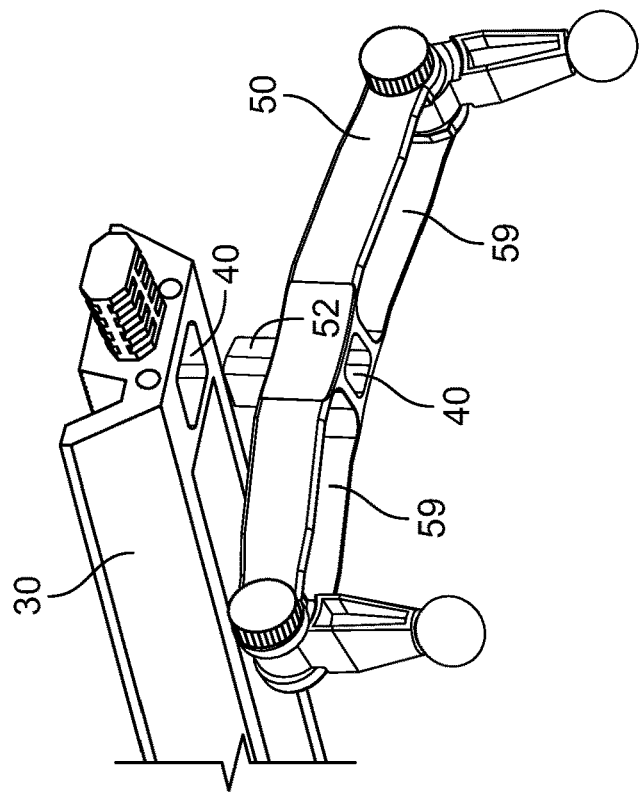
FIG. 10A is a bottom perspective view of a bipod leg and straight track piece before mating according to selected embodiments of the current disclosure.

FIG. 10A is a bottom perspective view of a bipod leg and straight track piece before mating according to selected embodiments of the current disclosure. FIG. 10B is a bottom perspective view of a bipod leg mated to a straight track piece according to selected embodiments of the current disclosure. The male leg connection 52 of the leg 50 mates with the female leg connection 40 of the track, in this figure, straight track 30. The magnet (not shown in these figures) in the top of the male leg connection 52 mates with a magnet (not shown in these figures) within the female leg connection 40 of the track. Swing arm cavities 59 are visible within the bottom of the leg 50. Additionally, each leg 50 may also include a female leg connection 40 below the male leg connection 52.

FIG. 11 is a perspective view of a bipod leg with the arms rotated within the main body of the leg according to selected embodiments of the current disclosure. The swing arms 57 of the leg are each rotated within swing arm cavities 59 of the main leg body 51, as showed in this wired view. The leg also has a male leg connection 52, which is a protrusion on top and a female leg connection 40, which is a depression and also referred to as a nested leg connector, accessible through the bottom of the leg body 51.

FIG. 12 is a perspective view of stacked bipod legs according to selected embodiments of the current disclosure. The male leg connection 52 of the lower leg 50 mates with the female leg connection 40 of the upper leg 50. A magnet 53 in the top of the male leg connection 52 of the lower leg mates with a magnet 53 within the female leg connection 40 of the upper leg 50. To provide for the close proximity of the legs to each other, the swing arms of the upper leg are rotated within the main body of the leg.

Figure 13:
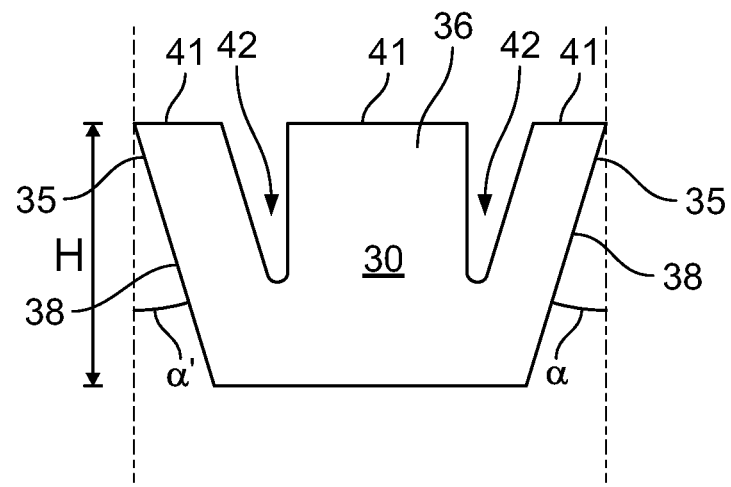
FIG. 13 is a cutaway front view of a track piece according to selected embodiments of the current disclosure.

FIG. 13 is a cutaway front view of a track piece according to selected embodiments of the current disclosure. The track 30 has a center rail 36 with an upper surface 41. Outer rails 35 also include upper surfaces 41. A valley 42 or space separates the center rail 36 from the outer rails 3. The outer surface 38 of each rail 35 extends inwards at an angle $\alpha$ and $\alpha'$ from the vertical. While not necessary, the advantage of having equal values for $\alpha$ and $\alpha'$ is that the track is symmetrical and then shuttle may be placed in either orientation, that is, the suspension arm may travel over either outer rail 35. The height H of the track is preferably, though not necessarily, consistent along the length of each track piece.

Figure 14:
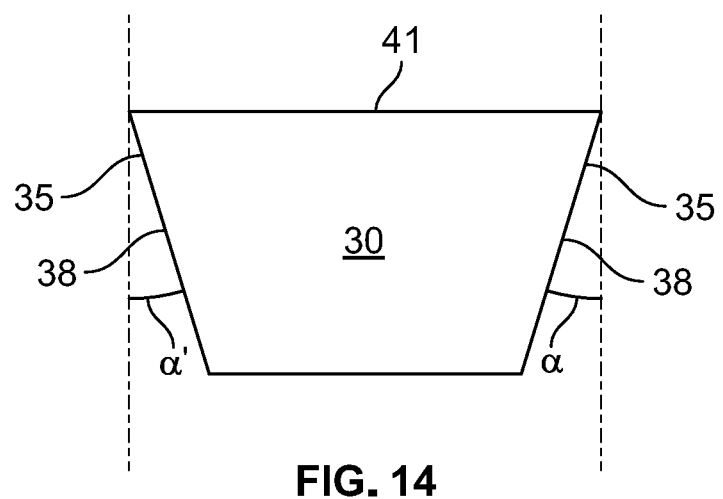
FIG. 14 is a cutaway front view of another track piece according to selected embodiments of the current disclosure.

FIG. 14 is a cutaway front view of another track piece according to selected embodiments of the current disclosure. The track 30 has a center rail and outer rails 35 that are merged together into a single continuous body providing a continuous upper surface 41. The outer rails 35 each have an outer surface 38 that extends inwards at an inward slope angle $\alpha$ and $\alpha'$ from the vertical. As with the track shown in FIG. 13, the advantage of having equal values for $\alpha$ and $\alpha'$ is that the track is symmetrical and then shuttle may be placed in either orientation, that is, the suspension arm may travel over either outer rail 35.

Figure 15:
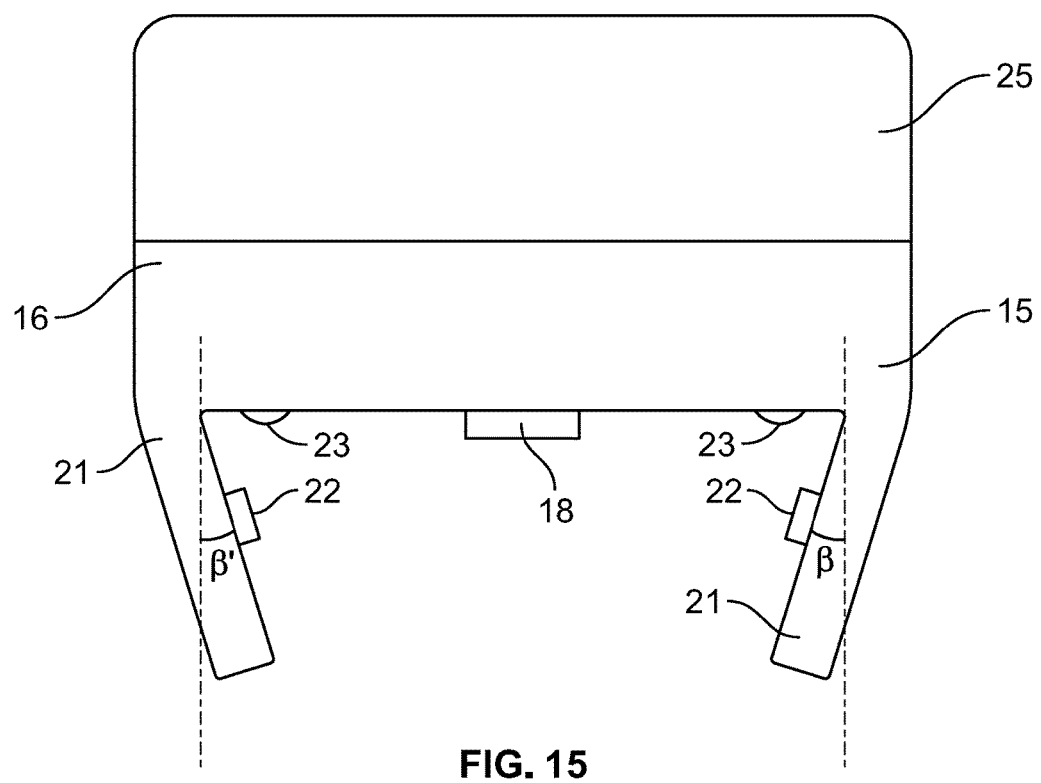
FIG. 15 is a front view of a shuttle according to selected embodiments of the current disclosure.

FIG. 15 is a front view of a shuttle according to selected embodiments of the current disclosure. The main body 16 and suspension arm 15 each have one or more side rollers 21 that extend down and inward. More specifically, the inner surface of each side roller extends inwards at an angle $\beta$ and $\beta'$ from the vertical. The angles $\beta$ and $\beta'$ complement or match angles $\alpha$ and $\alpha'$ of the track such that the inner surface of the side roller is substantially parallel and planer to the outer surface of the outer rails. As shown in this view, wheels 22 extends slightly beyond the inner surface of the side rollers 21 to engage the outer surface of the outer rails. Nubs 23 engage the upper surface 41 of the outer rails. Drive wheel 18 engages the upper surface 41 of the center rail.

Various materials may be used in the construction of the tracks and legs, including plastic, metal and wood. The shuttle, in certain embodiments, is designed to be weather resistant, and thus should be constructed of appropriate materials. For example, the shuttle housing may be constructed of plastic, with electrical components therein. The main body itself may also be plastic, utilizing plastic nubs and wheels in the side rollers as well as a rubber drive wheel. The drive wheel may also be made of a plastic material, especially if it is a geared drive wheel that mates with grooves on the upper surface of the track.

While various embodiments have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

That which is claimed:

1. A camera slider system comprising
    a track having an upper surface, a first outer rail, a second outer rail, a first track connecter, a second track connecter, and a leg connecter, where the first track connecter includes a protrusion, where the second connecter includes a depression, where an outer surface of the first rail has an inward slope, and where an outer surface of the second rail has an inward slope;
    a leg having a leg connecter, where the leg connecter of the leg mates with the leg connecter of the track, where the leg has a leg body and two arms, where each arm is rotatably secured to the leg body by a hinge, where the leg body has two swing arm cavities into which the swing arms may rotate;

a shuttle having a main body and a suspension arm, where the main body includes a drive wheel, and a side roller, where the drive wheel engages the upper surface of the track, where the suspension arm provides a force pulling the main body towards the suspension arm, where the suspension arm engages the outer surface of the first rail, and where the side roller engages the outer surface of the second rail.

2. The camera slider system of claim 1, wherein the first track further includes a first fastener, wherein the second track further includes a second fastener.

3. The camera slider system of claim 1, where the suspension arm has an inward slope that matches the inward slope of the outer surface of the first rail, and where an inner surface of the side roller has an inward slope that matches the inward slope of the outer surface of the second rail.

4. The camera slider system of claim 1, wherein the shuttle also has a motor, where the motor drives the drive wheel.

5. The camera slider system of claim 1, wherein the inward slope of the outer surface of the second rail matches the inward slope of the outer surface of the first rail such that both the inward slope of the inner surface of the suspension arm and the inward slope of the inner surface of the side roller match the inward slope of the outer surface of the first rail and the inward slope of the outer surface of the second rail.

6. The camera slider system of claim 1, wherein the suspension arm further includes a spring, where the spring provides the force pulling the main body towards the suspension arm.

7. The camera slider system of claim 1, wherein the suspension arm includes a wheel, where the wheel of the suspension arm engages the outer surface of the first rail.

8. The camera slider system of claim 1, wherein the side roller includes a wheel, where the wheel of the side roller engages the outer surface of the second rail.

9. The camera slider system of claim 1, wherein the main body further includes a plurality of stabilizing nubs, where the stabilizing nubs engage the upper surface of the track.

10. The camera slider system of claim 1, wherein the drive wheel is a drive gear, and where the upper surface of the track has a grooved face, where the drive gear engages the grooved face of the upper surface of the track.

11. The camera slider system of claim 1, wherein the main body of the shuttle further includes a mounting screw for securing a camera body thereto.

12. The camera slider system of claim 1, wherein the leg body of the leg further comprises a nested leg connecter, where the leg connector of the leg has a protrusion, and where the nested leg connector of the leg body has a depression.

13. The camera slider system of claim 1, wherein the track has a central rail, where there is a first space between the first rail and the central rail, and where there is a second space between the second rail and the central rail.

14. A slider system comprising
a plurality of tracks, where each track has an upper surface, a first outer rail, a second outer rail, a first track connecter, a second track connecter, where the first track connecter includes a protrusion, where the second connecter includes a depression, where an outer surface of the first rail has an inward slope, and where an outer surface of the second rail has an inward slope, where the first track connector of one of the plurality of tracks mates with the second track connector of another of the plurality of tracks, where the first track connecter of each track has a magnet, wherein the second track connecter of each track has a magnet, where the magnet of the first track connecter of one of the tracks mates with the magnet of the second track connecter of another of the tracks;
a shuttle having a main body and a suspension arm, where the main body includes a drive wheel and a side roller, where the drive wheel engages the upper surface of the track, where the suspension arm provides a force pulling the main body towards the suspension arm, where the suspension arm engages the outer surface of the first rail, and where the side roller engages the outer surface of the second rail.

15. The slider system of claim 14, wherein the suspension arm has an inner surface with an inward slope, where the inward slope of the outer surface of the first rail complements the inward slope of the inner surface of the suspension arm.

16. The slider system of claim 14, wherein the side roller has an inner surface with an inward slope, where the inward slope of the outer surface of the second rail complements the inward slope of the inner surface of the side roller.

17. A slider track system comprising
a plurality of tracks, where each track has an upper surface, a first outer rail, a second outer rail, a first track connecter, a second track connecter, and a first leg connection, where the first track connecter includes a protrusion, where the second connecter includes a depression, where an outer surface of the first rail has an inward slope, and where an outer surface of the second rail has an inward slope, where the first track connector of one of the plurality of tracks mates with the second track connector of another of the plurality of tracks; and
a plurality of bipod legs, where each bipod leg has a main body and two arms, where each arm is secured to the main body by a hinge, where the main body has a first leg connection, a second leg connection, and two arm cavities, where the arms may rotate about the hinge and into the arm cavities;
where the second leg connection of each bipod leg can mate with the first leg connection of each track.

18. The slider track system of claim 17, wherein the first leg connection of each track is a female leg connection, and where the second leg connection of each bipod leg is a male leg connection.

* * * * *